United States Patent
Pophusen et al.

(10) Patent No.: US 6,541,087 B1
(45) Date of Patent: Apr. 1, 2003

(54) MULTILAYER, BIAXIALLY STRETCHED, HIGH-BARRIER PLASTIC SKIN

(75) Inventors: Dirk Pophusen, Leverkusen (DE); Nils Schröder, Fallingbostel (DE)

(73) Assignee: Wolff Walsrode AG, Walsrode (DE)

( * ) Notice: Subject to any disclaimer, the term of this patent is extended or adjusted under 35 U.S.C. 154(b) by 142 days.

(21) Appl. No.: 09/660,076

(22) Filed: Sep. 11, 2000

(30) Foreign Application Priority Data

Sep. 14, 1999 (DE) .......................... 199 43 910

(51) Int. Cl.⁷ .................. B29D 22/00; B29D 23/00; B32B 1/08
(52) U.S. Cl. .................. 428/36.7; 428/34.8; 428/34.9; 428/35.4; 428/36.91; 428/474.4
(58) Field of Search ................. 428/34.8, 34.9, 428/35.2, 35.4, 35.7, 36.6, 36.7, 36.9, 36.91, 500, 515, 516, 519, 521, 523, 474.4

(56) References Cited

U.S. PATENT DOCUMENTS

| | | | |
|---|---|---|---|
| 4,851,245 A | 7/1989 | Hisazumi et al. | 426/105 |
| 4,888,223 A | 12/1989 | Sugimoto et al. | 428/34.9 |
| 5,185,189 A | 2/1993 | Stenger et al. | 428/34.8 |
| 5,399,427 A | 3/1995 | Stenger et al. | 428/348 |
| 5,425,974 A | 6/1995 | von Widdern et al. | 428/348 |
| 5,612,104 A | 3/1997 | Grund | 428/348 |
| 5,747,124 A | 5/1998 | Pophusen et al. | 428/34.8 |
| 5,863,643 A | 1/1999 | von Widdern et al. | 428/220 |
| 5,914,164 A * | 6/1999 | Ciocca et al. | 428/36.7 |
| 5,985,386 A | 11/1999 | Von Widdern et al. | 428/220 |
| 6,063,417 A * | 3/2000 | Paleari et al. | 426/127 |
| 6,274,246 B1 * | 8/2001 | Eggers et al. | 428/474.4 |

FOREIGN PATENT DOCUMENTS

| | | | | |
|---|---|---|---|---|
| CA | 2231627 | * | 11/1998 | ........... A22C/13/00 |
| DE | 2850181 | | 5/1980 | |
| EP | 0 465 931 A2 | * | 1/1992 | ........... B32B/27/34 |
| EP | 0 530 549 | | 6/1999 | |
| JP | 64-14032 | | 1/1989 | |

* cited by examiner

Primary Examiner—Harold Pyon
Assistant Examiner—Michael C. Miggins
(74) Attorney, Agent, or Firm—Joseph C. Gil; James R. Franks; Aron Preis

(57) ABSTRACT

A multilayerd, biaxially stretched tubular film having the following sequence of layers, |A|B|C|D|E|F|G|, is described. Inner layer A contains at least one member selected from the group consisting of aliphatic (co)polyamide and partially aromatic (co)polyamide. Core layer E, consists essentially of at least one member selected from the group consisting of aliphatic (co)polyamide and partially aromatic (co) polyamide. Outer layer G contains at least one member selected from the group consisting of aliphatic (co) polyamide and partially aromatic (co)polyamide. Interlayer C is polyolefinic, has water vapor barrier properties, and is interposed between inner layer A and core layer E. Interlayer C is directly attached to layer A via coupling layer B and to layer E via coupling layer D. Coupling layers B and F each independently contain a modified polyolefin. Interior layer F has oxygen barrier properties, and is interposed between outer layer G and core layer E. The composition of inner layer A, core layer E and outer layer G are each independent one from the other.

11 Claims, No Drawings

MULTILAYER, BIAXIALLY STRETCHED, HIGH-BARRIER PLASTIC SKIN

CROSS REFERENCE TO RELATED PATENT APPLICATION

The present patent application claims the right of priority under 35 U.S.C. §119 (a)–(d) of German Patent Application No. 199 43 910.9, filed Sep. 14, 1999.

FIELD OF THE INVENTION

This invention relates to a multilayer, biaxially stretched, polyamide-based, polyvinylidene chloride copolymer-free (PVDC-free), plastic skin which exhibits elevated oxygen and water vapour barrier properties and in particular avoids weight loss and greying phenomena of the contents during extended storage even outside cold storage conditions.

BACKGROUND OF THE INVENTION

As is known, the casings of boiled and boiling sausages must meet wide-ranging and specific requirements in order to comply with practical requirements.

These requirements substantially include:

- elevated strength of the casing, such that permanent plastic deformation of the casing or even bursting of the casing due to the internal pressure arising during filling or boiling cannot occur
- highly cylindrical shape of the finished sausages, such that, firstly, they exhibit an attractive appearance which appeals to potential purchasers and, secondly, that they may readily be packed in large packages, such as cartons etc.
- tautness of the sausages, so ensuring that the casing encloses the contents without creases, imparting an appearance which appeals to potential purchasers
- good sealability (clippability)
- heat resistance up to sterilisation temperature
- very good barrier properties towards water vapour to reduce weight loss, such that creasing of the product may be avoided.
- very good barrier properties towards oxygen (reduction of greying of sausage mix)
- elevated adhesion to the sausage mix to avoid the formation of jelly between the casing and the contents
- good peelability, good slicing behaviour
- good shirrability with regard to various shirring methods (axial shirring, helical shirring)
- good thermal deformability to ensure that the casings may readily be shaped into conventionally shaped rings (A, B and C rings) and into natural shaped casings
- compliance with foodstuffs legislation (EC Directives, Bundesamt fur gesundheitlichen Verbraucherschutz und Veterinärmedizin [German Federal Office for Consumer Health Protection and Veterinary Medicine] (BGVV), Food & Drug Administration (FDA)) and fulfilment of environmental requirements with regard to the avoidance of halogenated compounds and heavy metals.
- reliable printing ink adhesion
- low cost production process.

Single and multilayer casings have long been prior art. Casings which have hitherto been developed, however, have never been able to meet the entire range of requirements.

DE 28 50 181 describes a single layer, biaxially stretched casing of a polymer blend of aliphatic polyamide and an olefinic copolymer. While incorporation of the olefinic copolymer may indeed bring about a distinct reduction in water vapour permeation, in particular the water vapour barrier action which is achieved is far poorer than that of PVDC. The inadequate water vapour barrier properties means that weight losses occur due to evaporation of water over the course of the storage period. This not only reduces revenue from the sausage product, but also gives rise to creased, unattractive products.

Japanese application JP 10 14 032 describes a biaxially stretched, coextruded tubular film comprising three polymer layers for use as casing for boiled and boiling sausages, wherein the outer layer facing away from the contents, consists of aliphatic polyamide (PA) and the inner layer facing towards the contents consists of ethylene/acrylic acid copolymers. The ply arranged between the outer and inner layer of copolymers based on propylene or ethylene acts as coupling agent. The inner polymer layer of ethylene/acrylic acid copolymers here imparts adhesion to the sausage mix. According to a subsequent application, GB 22 05 273, the adhesive properties of the inner layer of linear low density polyethylene (LLDPE) facing towards sausage mix are improved by a complex corona treatment acting upon the inside of the tubular film. While good water vapour barrier properties may be achieved by this film structure, consumers in particular criticise properties, such as excessive tear propagation resistance, inadequate adhesion to the sausage mix and superficial greying of contents sensitive to oxygen and light during storage.

According to EP-A 02 16 094, improved oxygen barrier properties simultaneously accompanied by elevated permeability to smoke flavourings are achieved in single layer PA casings by blending aliphatic PA with ethylene/vinyl alcohol copolymers (EVOH). While the addition of EVOH may indeed bring about a distinct reduction in oxygen permeation, this is not enough effectively to suppress surface greying of the contents during storage. Moreover, inadequate thermal stability of the EVOH during coextrusion with PA at relatively high temperatures results in crosslinking of the EVOH, which disrupts the production process for this casing. The inadequate water vapour barrier properties result in sausage products becoming creased during storage.

DE-A 41 41 292 describes a single layer, biaxially oriented, tubular PA foodstuff casing which substantially consists of aliphatic polyamide, partially aromatic copolyamide, acid-modified polyolefin and ultrafine pigment. While the objective of this film formulation is in particular to ensure adequate light barrier properties, the barrier properties with regard to water vapour and oxygen permeation are inadequate.

DE-A 41 28 081 describes a multilayer, biaxially stretched tubular film which comprises as core layer at least one oxygen barrier ply of EVOH, aromatic or aliphatic (co)polyamide and, as inner layer, at least one water vapour barrier ply of aliphatic (co)polyamide. This casing meets the requirements for good water vapour barrier properties and also exhibits good adhesion to the contents. However, during storage, moisture passes from the contents into the core layer, which acts as the oxygen barrier layer. Since th[]e moisture accumulates in the core layer and cannot be released through the outer polyolefin layer, which acts as the water vapour barrier layer, oxygen barrier properties become ever poorer during storage. This casing is accordingly unsuitable for extended periods of storage, in particular for storage without refrigeration. An outer polyolefin layer furthermore has the disadvantage that, before being printed, the film must be subjected to an additional step, for example corona discharge, in order to ensure sufficient adhesion of the printing inks.

DE-A 41 30 486 describes a five-layer, coextruded, biaxially stretched tubular film which comprises at least three polyamide layers, which form the core, inner and outer layers. Layers of EVOH or coupling agents are located between these layers. In the proposed film structure, one or two coupling layers, consisting of functionally modified polyolefins, are intended to act as the water vapour barrier. Due to the functional groups, such modified polyolefins have higher water vapour permeability values than the corresponding unmodified polyolefins and thus, at an identical layer thickness, do not achieve the water vapour barrier properties thereof.

EP-A 04 67 039 A2 claims a multilayer, tubular packaging casing based on polyamide, which casing is characterised in that it is produced from an outer layer based on aliphatic polyamide, aliphatic copolyamide or a polymer blend of at least one of these compounds, a middle layer of polyolefin and coupling component together with an inner layer based on aliphatic and/or partially aromatic polyamides and/or aliphatic and/or partially aromatic copolyamides. The outer layer is the actual support layer of the multilayer casing and is also the thickest layer in comparison with the other two layers. If it is intended to improve the oxygen barrier properties of the casing, the inner layer is produced from a mixture of aliphatic polyamide and partially aromatic polyamide. However, since the inner layer is to be provided as a very thin layer, no particularly good oxygen barrier properties may be expected as a result. The middle layer, which is intended to provide water vapour barrier properties, consists of a mixture of polyolefin and a coupling component. The coupling component comprises a polyolefin modified with functional groups. Since these modified polyolefins have higher water vapour permeability than the corresponding unmodified polyolefins, this addition impairs the per se good water vapour barrier properties of the polyolefins. Furthermore, in comparison with a layer of pure coupling agent, the middle layer exhibits weaker adhesion to the polyamide layers, which may result in delamination phenomena. It has been found that such casings still do not meet all requirements. Sausages packaged in such casings, in particular when stored without refrigeration, accordingly still exhibit excessive weight loss, colour change of the surface of the contents and creasing of the products after extended storage.

DE-A-43 39 337 describes a five-layer tubular film for packaging and wrapping pasty foodstuffs. This tubular film, in particular sausage casing, based on polyamide is characterised in that it is produced from an internal and an external layer of the same polyamide material consisting of at least one aliphatic polyamide and/or at least one aliphatic copolyamide and/or at least one partially aromatic polyamide and/or at least one partially aromatic copolyamide, a middle polyolefin layer and two coupling layers consisting of the same material. The content of partially aromatic polyamide and/or copolyamide is 5 to 60%, in particular 10 to 50%, relative to the total weight of the polymer blend of partially aromatic and aliphatic polyamides and copolyamides. The disadvantage of this casing is the inadequacy of its oxygen barrier properties, which often gives rise to colour change (greying) of contents susceptible to oxidation, such as liver sausage. As is known, partially aromatic polyamides have better oxygen barrier properties than aliphatic polyamides, but the barrier properties achieved are far poorer than those achievable with ethylene/vinyl alcohol copolymers.

EP-A-0 879 560 discloses a multilayer, biaxially stretched foodstuff casing having two oxygen barrier layers. Since, in order to achieve adequate composite adhesion, it is necessary to blend the polyolefin layer with coupling agents, the barrier function of this layer is severely impaired by the increased number of functional groups. The casings produced in the manner described in said document exhibit deficiencies in use with regard to processing and barrier behaviour, in particular on extended storage.

The described prior art film composites exhibit deficiencies in individual aspects with regard to the range of requirements described above. In particular, commercially known casings exhibit deficiencies in respect of the essential features of barrier properties either towards water vapour or towards oxygen. It has not hitherto been possible to achieve a combination of these barrier properties with regard to the stated requirements for extended storage.

SUMMARY OF THE INVENTION

The object thus arose of providing a sausage casing based on polyamide which meets all the requirements listed in the introduction and in particular combines oxygen barrier and water vapour barrier properties.

It has proved possible according to the invention to remedy the serious defect of known casings with regard to barrier properties by the provision of a multilayer, biaxially stretched tubular film made from a) an inner layer A lying against the contents, which substantially consists of aliphatic polyamide or copolyamide and/or partially aromatic polyamide or copolyamide, b) a core layer E, which substantially consists of aliphatic polyamide or copolyamide and/or partially aromatic polyamide or copolyamide, c) an outer layer G, which substantially consists of aliphatic polyamide or copolyamide and/or partially aromatic polyamide or copolyamide, wherein d) a polyolefinic interlayer C having water vapour barrier properties is located between the inner layer A and core layer E, e) which interlayer is directly attached to layer A via a coupling layer B and to layer E via a coupling layer D, and wherein f) an interlayer F having oxygen barrier properties is located between the outer layer G and core layer E.

DETAILED DESCRIPTION OF THE INVENTION

Suitable aliphatic polyamides and copolyamides are those polyamides as are described in general terms in *Kunststoffhandbuch*, part 3/4, Polyamide, pages 22 et seq., Carl Hanser Verlag, Munich, Vienna, 1998. The aliphatic polyamide is a homopolyamide prepared from aliphatic primary diamines and aliphatic dicarboxylic acids or a homopolymer of ω-aminocarboxylic acids or the lactams thereof. The aliphatic copolyamide contains the same units and is, for example, a polymer based on one or more aliphatic diamines and one or more dicarboxylic acids and/or one or various co-aminocarboxylic acids or the lactams thereof. The aliphatic primary diamines in particular contain 4 to 8 C atoms. Suitable diamines are tetra-, penta-, hexa- and octamethylenediamine, with hexamethylenediamine being particularly preferred. The aliphatic dicarboxylic acids in particular contain 4 to 12 C atoms. Examples of suitable dicarboxylic acids are adipic acid, azelaic acid, sebacic acid and dodecanedicarboxylic acid. The ω-aminocarboxylic acid or the lactams thereof contain 6 to 12 C atoms. One example of ω-aminocarboxylic acid is 11-amino-undecanoic acid. Examples of lactams are ε-caprolactam and ω-laurolactam. Particularly preferred aliphatic polyamides are polycaprolactam (PA 6) and polyhexamethyleneadipamide (PA 66). One particularly preferred aliphatic copolyamide is PA 6/66, which consists of caprolactam, hexamethylenediamine and adipic acid units.

Polyamides having aromatic components are described also in Kunststoffhandbuch, part 3/4, *Polyamide*, pages 803 et seq., Carl Hanser Verlag, Munich, Vienna, 1998. Partially aromatic polyamides and copolyamides are in particular taken into consideration for extrusion purposes. In the partially aromatic polyamides and copolyamides, it is possible either for the diamine units predominantly or exclusively to form the aromatic units, while the dicarboxylic acid units are predominantly or exclusively of an aliphatic nature, or for the diamine units to be predominantly or exclusively of an aliphatic nature, while the dicarboxylic acids predominantly or exclusively form the aromatic units. Examples of the first embodiment are partially aromatic polyamides or copolyamides, in which the aromatic diamine units consist of xylylenediamine and phenylenediamine. The aliphatic dicarboxylic acid units of this embodiment usually contain 4 to 10 C atoms, such as for example adipic acid, sebacic acid and azelaic acid. Apart from the aromatic diamine units and the aliphatic dicarboxylic acid units, aliphatic diamine units and aromatic dicarboxylic acid units may additionally be present each in quantities of up to 5 mol %. One particularly preferred embodiment consists of m-xylylenediamine and adipic acid units. This polyamide (PA-MXD6) is, for example, sold by Mitsubishi Gas Chemical Company Inc. under the name MX-Nylon. Examples of this second embodiment are partially aromatic polyamides and copolyamides in which the aliphatic diamines usually contain 4 to 8 C atoms. Among the aromatic dicarboxylic acids, particular emphasis should be placed upon isophthalic acid and terephthalic acid. Apart from the aliphatic diamine units and the aromatic dicarboxylic acid units, aromatic diamine units and aliphatic dicarboxylic acid units may additionally also be present each in quantities of up to 5 mol %. One particularly preferred embodiment consists of units of hexa-methylenediamine, isophthalic acid and terephthalic acid. This polyamide (PA 6I/6T) is, for example, sold by DuPont de Nemours under the name Selar PA. The partially aromatic polyamide PA 6I/6T is preferably added in quantities of between 2 and 40 wt. % per layer, in particular between 5 and 20 wt. %. The partially aromatic polyamide PA-MXD6 is preferably added in quantities of between 5 and 40 wt. % per layer, in particular between 10 and 30 wt. %.

The composition of the individual layers A, E and G may be different or identical. In one particularly suitable embodiment, layers A and G are substantially based on aliphatic homopolyamide PA 6 and the core layer E is substantially based on aliphatic copolyamide PA 6/66. The partially aromatic polyamide PA 6I/6T is preferably added in quantities of between 2 and 40 wt. % per layer, in particular between 5 and 20 wt. %. The partially aromatic polyamide PA-MXD6 is preferably added in quantities of between 5 and 40 wt. % per layer, in particular between 10 and 30 wt. %.

In an embodiment of the present invention the aliphatic (co)polyamide of each of layers A, E and G is selected independently from polyamide 6 (PA 6), polyamide 66 (PA 66), polyamide 11 (PA 11), polyamide 12 (PA 12), polyamide 6.66 (PA 6.66), polyamide 6.8 (PA 6.8), polyamide 6.9 (PA 6.9), polyamide 6.10 (PA 6.10) and polyamide 6.12 (PA 6.12).

In a preferred embodiment, the layer thickness of the inner layer A is between 2 and 12 μm, in particular between 3 and 8 μm.

Suitable polyolefins are homopolymers of ethylene or propylene or copolymers of linear β-olefins having 2 to 8 C atoms or mixtures of these homopolymers or copolymers with each other. Metallocene polyolefins are moreover suitable. These comprise polyolefins which have been produced with the assistance of so-called metallocene catalysts and have advantages over conventionally produced polyolefins, for example exhibiting higher puncture resistance values or also more favourable barrier properties. Bohn and Fleißner provide a review of metallocene polyolefins in *Kunststoffe* 88 (1998), pages 1864–1870, Carl Hanser Verlag, Munich.

The coupling layers B and D each comprise preferably a modified polyolefin. Modified polyolefin in the present context is a homo or copolymer of ethylene or propylene each optionally copolymerized with at least one linear o-olefin having 3 to 8 C atoms, which is grafted with at least one selected monomer from the group consisting of α,β-unsaturated dicarboxylic acids, (such as for example maleic acid, fumaric acid, itaconic acid) their acid anhydrides, acid esters, acid amides or acid imides. Further suitable copolymers are ionomeric copolymers of ethylene and propylene and optionally further linear x-olefins containing 3 to 8 C atoms copolymerized with α,β-unsaturated carboxylic acids and/or the metal salts thereof and/or the alkyl esters thereof or graft polymers of the stated monomers onto polymers or partially saponified ethylene/vinyl ester copolymers, which are optionally graft polymerised with a monomer of the stated acids. In a preferred embodiment, the layer thicknesses of the coupling agent layers B and D are between 1 and 6 μm. The composition of layers B, D may be different or identical.

Layer F having oxygen barrier properties in particular substantially consists of ethylene/vinyl alcohol copolymers produced by saponification of ethylene/vinyl acetate copolymer. The ethylene content is here preferably between 25 and 47 wt. % and in particular between 29 and 38 wt. %. In a preferred embodiment, the layer thickness of layer F is between 2 and 8 μm, in particular between 3 and 6 μm.

The sum of all the layer thicknesses of the coextruded casing is 30 to 80 μm, in particular 35 to 65 μm.

The casings exhibit free shrinkage in at least one direction of orientation, measured at 100° C. after 15 minutes, of between 5 and 25%, in particular between 10 and 20%. At below 40° C., free shrinkage is below 3%, so ensuring sufficient storage stability of the heat set casings.

One or more layers of the casings produced may be pigmented, preferably by the addition of a masterbatch. The outer layer is preferably pigmented, but further layers, in particular the core layer E and/or the polyolefinic layer C, may alternatively or additionally be pigmented. Additives may be added to the inner layer A and/or to the outer layer G in order to improve processing behaviour and opening behaviour. Antiblocking and lubricant additives have in particular proved suitable in this connection. These are based, for example, on silicon oxide.

UV light absorbers may be added to individual layers in order to reduce the action of light on the contents, especially in the case of uncoloured or only partially coloured casings. Micronised inorganic pigments, in particular zinc, titanium, iron and silicon oxides, have proved effective to this end. In a particularly preferred embodiment, the ultrafine inorganic pigment is incorporated into the film composite by means of a masterbatch, the carrier material of which is compatible with the base material of the layer. The quantity of the pigment is from 0.1 to 5 wt. %, preferably from 0.5 to 2.5 wt. %, relative to the total weight of the casing.

The invention also provides the use thereof as foodstuff casings or casings for animal food. They are in particular suitable not only for packaging sausage, but also for packaging cheese, pastry and other pasty or liquid foodstuffs.

Using the tubular film according to the invention makes it possible for the processor to produce a product which, even after extremely long periods of storage, even without refrigeration, suffers no or only very slight loss of weight (moisture) through the casing or greying due to penetration of atmospheric oxygen from outside. Hitherto known films, in particular in relation to extended storage, exhibit deficiencies with regard to the combination of oxygen and water vapour barrier properties. This shortcoming is remedied by the tubular film according to the invention.

The tubular film according to the invention is preferably produced using the "double bubble" process, in which the tubular extrudate is initially converted into the solid state by intensive cooling and, as the production process proceeds, the resultant thick-walled primary tube (300 to 600 μm) is then reheated to a temperature suitable for solid stretching in order subsequently to be stretched in both transverse and longitudinal direction between two tightly sealed roller pairs by trapping a cushion of compressed air. The primary tube may be reheated in one or more stages, for example by means of hot air, steam, temperature-controlled water bath and/or infrared sources. After the first stretching stage, the skin, which has again been inflated by a compressed air cushion between two pressure rollers, is permitted to undergo a defined level of recovery (reduction in diameter) in a second bubble and a longitudinal post-stretching step is optionally simultaneously performed. The diameter of the tube may be controlled by varying the compressed air pressure in the heat setting stage which is subsequently to be performed. The desired shrinkage values of the skin may be precisely established by means of heat setting by adjusting the parameters recovery (quotient of the difference between the stretching gauge and heat setting gauge relative to the heat setting gauge), heat setting temperature and residence time. Higher flexibility may be achieved by performing heat setting in the presence of water or moist air: Before the biaxially stretched tubular film is wound, it should be cooled sufficiently in order to avoid activating the shrinkage tensions on the roll. The biaxially stretched tubular film is produced in a diameter range conventional for boiled and boiling sausage applications of between 25 and 220 mm, in particular between 30 and 150 mm.

The relevant properties of the sausage casings described below are determined using the following methods:

The sausages produced with the various casings were assessed once the finished sausages had thoroughly cooled down to cold store temperature. The same standardised boiled sausage test mix was used to produce the sample sausages. Filling pressure is adjusted specifically for each sausage casing. The individual test criteria were subjectively assessed using a rating scale ranging from 1 =best result to 6=poorest result.

Sausage Mix Adhesion

Subjective evaluation of the layer of sausage mix adhering to the skin once the casing has been peeled off.

Barrier Properties

Barrier properties are evaluated by evaluating weight losses on extended storage (duration 6 months at 23° C., 75% relative humidity) and a subjective visual evaluation of the degree of surface greying of the sausage mix.

Water vapour and oxygen permeability values were also measured instrumentally:

oxygen permeability in $cm^3 \cdot m^{-2} \cdot d^{-1} \cdot bar^{-1}$, measured at 23° C. and 75% relative humidity in accordance with DIN 53 380; water vapour permeability in $g \cdot m^{-2} \cdot d^{-1}$, measured at 23° C. and 85% relative humidity in accordance with DIN 53 122.

Peelability

Peelability was evaluated by peeling the skin from the sausage starting from a cut made in the sausage with a sharp knife. A rating of very good is achieved if the skin may be peeled from the sausage as a strip (approx. 3–5 mm in width) in a spiral without snagging or snapping. If the skin is torn in any direction, the tear should preferably return to the transverse direction (tearing), but should in no event exhibit a preference for longitudinal tearing. The occurrence of any delamination in particular earns negative marks.

Cylindrical Shape

Cylindrical shape is taken to mean the constancy of the finished gauge over the length of the sausage.

The following Examples are intended to illustrate the subject matter of the invention in greater detail.

EXAMPLE

The Examples shown below were performed using biaxially stretched tubular films of a diameter of 60 mm. The layers, consisting of different polymers, of the coextruded casings according to the invention and of the casings used in the Comparative Examples are abbreviated as follows:

| PA 6 | polyamide | e.g. Durethan B 40 F (Bayer AG) |
|---|---|---|
| CoPA | copolyamide, e.g. PA 6/66 | e.g. Ultramid C 35 FN (BASF AG) |
| | e.g. PA 6/69 | e.g. Grilon CF62BS (Ems-Chemie) |
| MXD6 | (partially) aromatic copolyamide, e.g. poly(m-xylyleneadipamide) | e.g. Nylon MX 6007 (Mitsubishi Gas Chem.) |
| HV | polyolefinic coupling agent | |
| | e.g. modified polyethylene | e.g. Admer L 2100 (Mitsui Chemicals) |
| | e.g. modified polypropylene | e.g. Novatex AP 196 P (Mitsubishi Kasei Co.) |
| | e.g. modified LLDPE | e.g. Ecsor CTR 2000 (Exxon Ltd.) |
| XX | ethylene/vinyl alcohol copolymer | e.g. EVAL LC F 101 BZ (Kuraray) |
| PO | polyolefin having water vapour barrier properties | |

-continued

|  | e.g. LLDPE | e.g. Dowlex 2045 E (Dow Chemical Co.) |
|---|---|---|
|  | e.g. plastomer polyolefin | e.g. Affinity PL 1881 (Dow Chemical Co.) |
|  | e.g. PP | e.g. Moplen X30S (Montell) |
| aPA | partially aromatic copolyamide, e.g. PA 6I/6T | e.g. Selar PA 3426 (DuPont de Nemours) |
| MBPA | polyamide 6-based masterbatch | e.g. colour masterbatch, PA white (Wilson Color S.A.) |
| MBPO | polyolefin-based masterbatch | e.g. colour masterbatch, PO white (Schulman) |
| AB | antiblocking masterbatch | e.g. PA 6 with added SiO$_2$ antiblocking agent |

The layer thicknesses of the individual layers stated in the Examples relate to the finished products, i.e. the stretched tubular films.

Example 1 (B.1)

| Layer A: (inner layer) | PA 6 | 5 μm |
|---|---|---|
| Layer B: | HV | 2 μm |
| Layer C: | PO + 20% MBPO | 15 μm |
| Layer D: | HV | 2 μm |
| Layer E: | CoPA | 5 μm |
| Layer F: | XX | 4 μm |
| Layer G: (outer layer) | PA 6 + 5% MBPA | 15 μm |

Example 2 (B.2)

| Layer A: (inner layer) | PA 6 + 5% AB | 5 μm |
|---|---|---|
| Layer B: | HV | 2 μm |
| Layer C: | PO | 15 μm |
| Layer D: | HV | 2 μm |
| Layer E: | PA 6 + 20% MXD6 | 5 μm |
| Layer F: | XX + 10% CoPA | 6 μm |
| Layer G: (outer layer) | PA 6 + 5% aPA | 15 μm |

Example 3 (B.3)

| Layer A: (inner layer) | PA 6 + 5% AB | 5 μm |
|---|---|---|
| Layer B: | HV | 2 μm |
| Layer C: | PO | 15 μm |
| Layer D: | HV | 2 μm |
| Layer E: | PA 6 + 20% MXD6 | 5 μm |
| Layer F: | XX | 5 μm |
| Layer G: (outer layer) | PA 6 + 5% aPA + 5% AB | 15 μm |

Comparative Example 1 (VB. 1)

| Layer A (inner layer): | PA6 | 20 μm |
|---|---|---|
| Layer B: | HV | 5 μm |
| Layer C: | EVOH | 3 μm |
| Layer D: | HV | 5 μm |
| Layer E: (outer layer): | PP | 15 μm |

Comparative Examples 2 (VB.2)

| Layer A (inner layer): | PA6 | 8 μm |
|---|---|---|
| Layer B: | HV | 4 μm |
| Layer C: | PA6 | 12 μm |
| Layer D: | XX | 3 μm |
| Layer E (outer layer): | PA6 | 22 μm |

Comparative Example 3 (VB.3

| Layer A (inner layer): | 90% PA6 + 10% MXD6 | 5 μm |
|---|---|---|
| Layer B: | HV | 5 μm |
| Layer C: | LLDPE | 17 μm |
| Layer D: | HV | 5 μm |
| Layer E (outer layer): | 90% PA6 + 10% MXD6 | 23 μm |

Comparative Examples 4 (VB.4)

| Layer A (inner layer): | 70% PA6 + 30% PA6I/6T | 5 μm |
|---|---|---|
| Layer B: | 80% LLDPE + 20% HV | 10 μm |
| Layer C (outer layer): | PA6 | 25 μm |

Comparative Example 5 (VB.5)

| Layer A (inner layer): | PA6/66 | 5 μm |
|---|---|---|
| Layer B: | HV | 8 μm |
| Layer C: | 80% XX + 20% PA6/69 | 7 μm |
| Layer D: | HV | 5 μm |
| Layer E (outer layer): | 60% PA6/66 + 30% MXD6 + 10% PA6I/6T | 25 μm |

The following Tables summarise the applicational evaluation of the casings produced according to the Examples and Comparative Examples:

|  | B.1 | B.2 | B.3 | VB.1 | VB.2 | VB.3 | VB.4 | VB.5 |
|---|---|---|---|---|---|---|---|---|
| Sausage mix adhesion | 1 | 1 | 1 | 5 | 1 | 1 | 1 | 2 |
| Weight loss | 1 | 1 | 1 | 3 | 3 | 3 | 4 | 3 |
| Greying | 1 | 1 | 1 | 2 | 2 | 4 | 4 | 4 |
| Peelability | 1 | 1 | 1 | 3 | 1 | 1 | 2 | 2 |
| Cylindrical shape | 1 | 1 | 1 | 3 | 1 | 3 | 4 | 1 |

-continued

|  | B.1 | B.2 | B.3 | VB.1 | VB.2 | VB.3 | VB.4 | VB.5 |
|---|---|---|---|---|---|---|---|---|
| Oxygen permeability [$cm^3 \cdot m^{-2} \cdot d^{-1} \cdot bar^{-1}$] | 3 | 3 | 2 | 4 | 4 | 20 | 25 | 10 |
| Water vapour permeability [$g \cdot m^{-2} \cdot d^{-1}$] | 2 | 1 | 2 | 4 | 4 | 3 | 6 | 4 |

What is claimed is:

1. A multilayered, biaxially stretched tubular film comprising layers A,B,C,D,E, F and G wherein
   a) a inner layer A contains at least one member selected from the group consisting of aliphatic (co)polyamide and partially aromatic (co)polyamide, and
   b) an core layer E, consists essentially of at least one member selected from the group consisting of aliphatic (co)polyamide and partially aromatic (co)polyamide, and
   c) an outer layer G contains at least one member selected from the group consisting of aliphatic (co)polyamide and partially aromatic (co)polyamide, and wherein
   d) an interlayer C is polyolefinic, has water vapor barrier properties, and is interposed between said inner layer A and core layer E, and wherein
   e) said interlayer C is directly attached to said layer A via courpling layer B and to layer E via coupling layer D, said coupling layers B and D comprising a modified polyolefin, and wherein
   f) an interior layer F having oxygen barrier properties is interposed between said outer layer G and core layer E, the composition of inner layer A, core layer E and outer layer G being independent of each other,
   said tubular film being prepared by double bubble process.

2. The film of claim 1, wherein partially aromatic (co) polyamide is synthesized from m-xylyleneamine and adipic acid units.

3. The film of claim 1, wherein partially aromatic (co) polyamide is synthesized from hexamethylene diamine isophthalic acid and terephthalic acid.

4. The film of claim 1, wherein said coupling layers bond D comprise polyolefin modified with acidanhydride groups or ionomeric copolymers.

5. The film of claim 1, wherein said polyolefinic layer C contains at least one member selected from the group consisting of (co)polyethylene, (co)poly-propylene and ethylene/propylene copolymer.

6. The film of claim 1 wherein layer F contains an ethylene/vinyl alcohol copolymer having 25–47wt. % of ethylene units.

7. The film of claim 1, comprising a thickness of 30 to 80 µm.

8. The film of claim 1, prepared by heat set.

9. The film of claim 1, wherein free shrinkagein at least one direction of orientation, measured at 100° C., after 15 minutes is 5 to 25%.

10. The film of claim 1, wherein one or more of the layers contains a pigment.

11. The film of claim 1 wherein said aliphatic (co) polyamide is at least one member selected from the group consisting of polyamide 6, polyamide 66, polyamide 11, polyamide 12, polyamide 6.66, polyamide 6.8, polyamide 6.9, polyamide 6.10 and polyamide 6.12.

* * * * *